United States Patent
Gancarcik

[11] Patent Number: 5,832,075
[45] Date of Patent: Nov. 3, 1998

[54] OFF-HOOK DETECTOR FOR HEADSET

[75] Inventor: Ed Gancarcik, Ottawa, Canada

[73] Assignee: Mitel Corporation, Kanata, Canada

[21] Appl. No.: 839,091

[22] Filed: Apr. 23, 1997

Related U.S. Application Data

[63] Continuation-in-part of Ser. No. 710,746, Sep. 20, 1996, abandoned.

[51] Int. Cl.[6] .................................................. H04M 1/60
[52] U.S. Cl. .......................................... 379/377; 379/387
[58] Field of Search .................................. 379/377, 382, 379/430, 387, 421

[56] References Cited

U.S. PATENT DOCUMENTS

| | | | |
|---|---|---|---|
| 985,169 | 2/1911 | Hartnett | 379/421 |
| 3,839,604 | 10/1974 | Pardee | 379/421 |
| 4,614,845 | 9/1986 | Conlon | 379/421 |
| 4,928,306 | 5/1990 | Biswas et al. | 379/201 |
| 5,210,791 | 5/1993 | Krasik | 379/377 |
| 5,504,812 | 4/1996 | Vangarde | 379/430 |

Primary Examiner—Daniel S. Hunter
Attorney, Agent, or Firm—Dilworth & Barrese

[57] ABSTRACT

An event detector for a headset connected to a telephone, comprising a switch for short circuiting a microphone of the headset and a circuit for detecting a hookswitch flash in the event the duration of the short circuiting of the microphone is greater than a predetermined minimum and less than a predetermined maximum duration.

4 Claims, 3 Drawing Sheets

OFF-HOOK DETECTOR FOR HEADSET

CROSS-REFERENCE TO RELATED APPLICATION

This is a continuation-in-part of Application Ser. No. 08/710,746, filed Sep. 20, 1996 now abandoned. The disclosure of 08/710,746 is incorporated by reference herein.

FIELD OF THE INVENTION

The present invention relates in general to telephone headsets, and more particularly to a circuit for short-circuit detection of a telephone headset for invoking special features and arbitrating between handset and headset operation in a telephone.

BACKGROUND OF THE INVENTION

Headsets are useful for hands free telephony in circumstances in which a person requires the use of his or her hands for operation of a computer, switchboard, etc. Headsets are connected to the handset port of a telephone set through an interface box. The interface box allows the user to select whether the headset or the handset is activated. Prior art interface boxes vary greatly in complexity, but most boxes include a headset volume control. Some such boxes are battery operated while others steal current from the microphone bias circuit.

U.S. Pat. No. 5,504,812 (Vangarde) discloses a headset and a detector for detecting the presence of the headset and in response activating a hands-free radio telephone. A three-position switch is located in the earpiece of the headset and is connected to the microphone boom to permit user call control by manually rotating the boom. In one embodiment, a further switch and capacitor are added in series with the three-position switch such that in the event the further switch is momentarily opened, a microprocessor connected to the detector implements a telephony hookswitch flash feature whereas, in the event the switch is opened for a sustained period, the detector determines that the microphone has been disconnected and therefore ends the call.

U.S. Pat. No. 5,210,791 (Krasik) discloses a telephone headset with detector circuit which utilises an LED in the earpiece to indicated on-line status.

Many PABX and central office telephony features are invoked via a hookswitch flash. Although the above-discussed prior art headsets are capable of detecting one or more of on-hook, off-hook and hookswitch flash conditions, they are not capable of doing so in a manner which does not interfere with a call in progress.

Other prior art of interest includes U.S. Pat. Nos. 985,169 (Hartnett) and 3,839,604 (Pardee).

SUMMARY OF THE INVENTION

According to the present invention, a circuit is provided for allowing the user to invoke a hookswitch flash signal directly without being required to press a special key on the telephone set, and in a manner which does not interfere with a call in progress. More particularly, according to a preferred embodiment of the invention, a hookswitch flash signal is generated by momentarily depressing a switch connected across the terminals of a headset microphone. Depressing the switch causes a short-circuit across the microphone so as to implement a mute function. A circuit is provided for detecting the short-circuit condition and provided the detected short-circuit condition is maintained for a period of time not less than a predetermined minimum and not greater than a predetermined maximum, a hookswitch flash is confirmed. Otherwise, the call in progress proceeds as usual except that the microphone is muted while the switch is depressed. The circuit according to the present invention provides simplified telephone functionality to the user at low cost, and without a requirement for additional signalling wiring as in prior art systems. Furthermore, the features of the present invention may be added to an existing headset telephone system as a retrofit, without requiring a user to purchase a new headset.

According to another aspect of the present invention, the circuit of the present invention distinguishes between telephone hookswitch and headset hookswitch signals and disables the handset microphone while the headset is in use.

BRIEF INTRODUCTION TO THE DRAWINGS

A detailed description of the preferred embodiment is provided herein below, with reference to the following drawings, in which.

DETAILED DESCRIPTION OF THE PREFERRED EMBODIMENT

Figure 1:
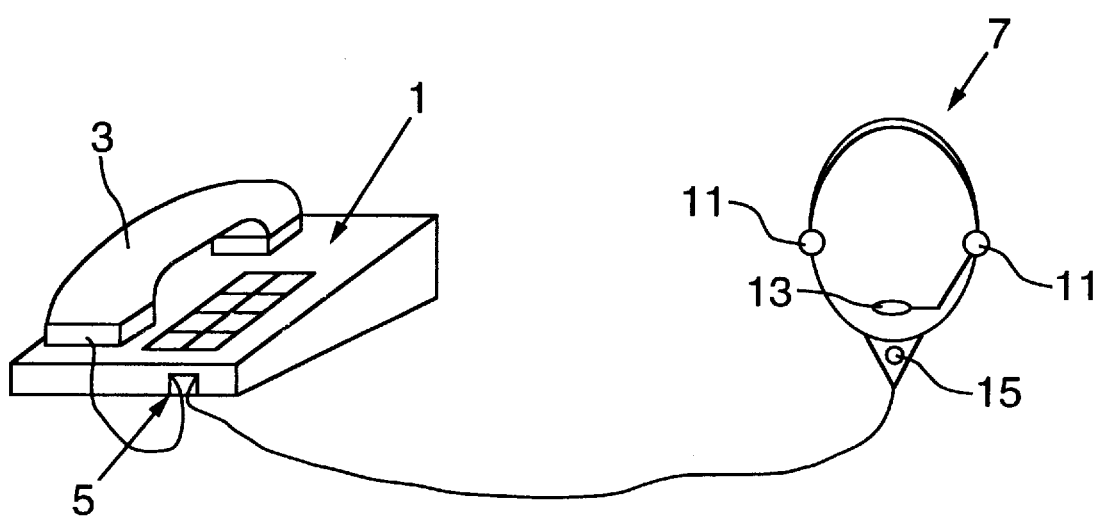
FIG. 1 shows a telephone headset with event detection connected to a telephone set in accordance with the present invention.

In FIG. 1, a standard telephone set 1 is shown with a handset 3 thereof resting in the cradle. The handset 3 is normally connected to the telephone set via a handset port 5 (e.g. RJ-11). In the illustrated embodiment, a headset 7 is also shown connected to the telephone set 1 via port 5. Headset 7 includes a pair of earpieces 11 and a microphone 13 (e.g. low voltage condenser microphone), in a usual manner.

Figure 2:
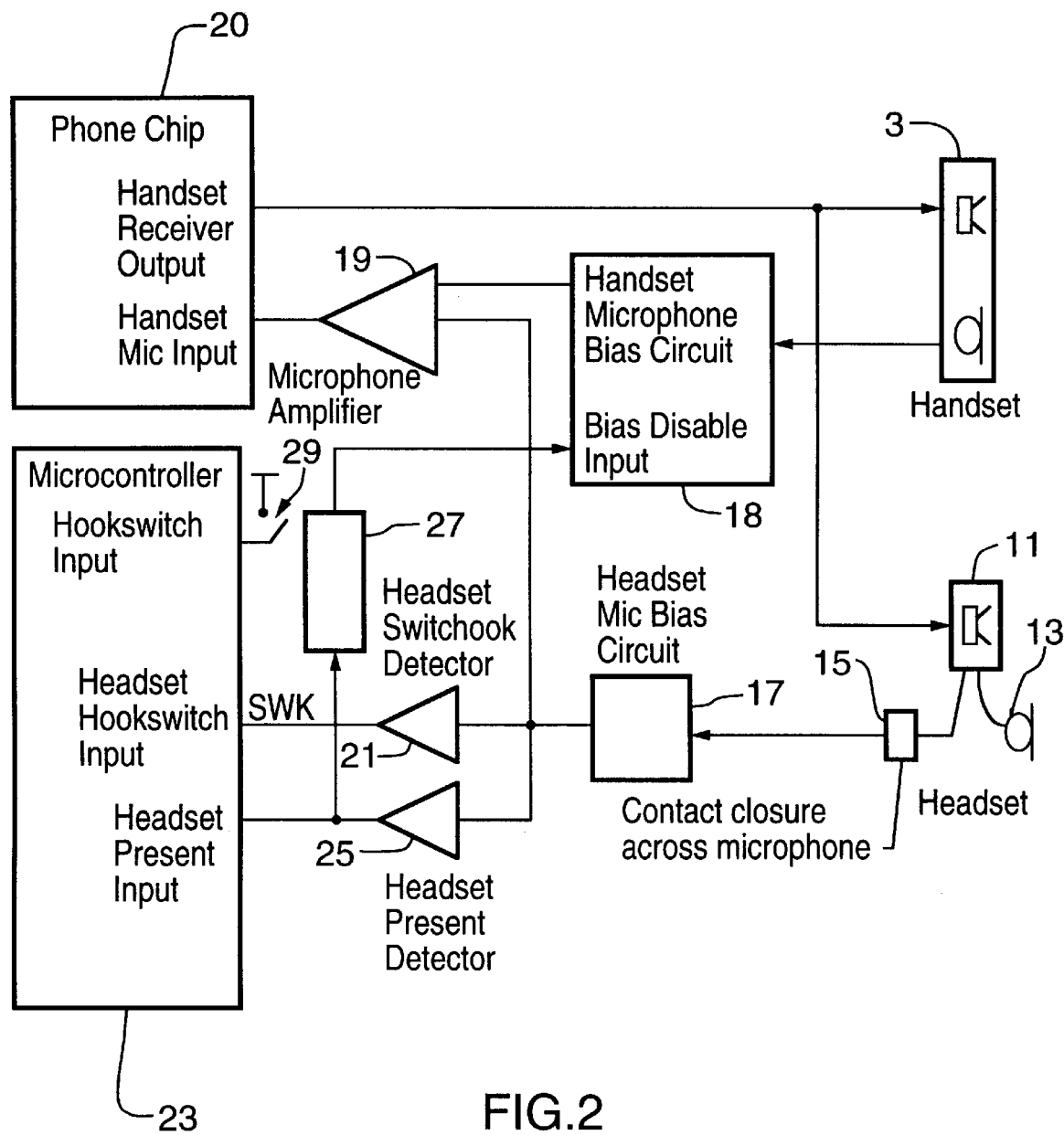
FIG. 2 is a block diagram of a circuit for implementing the detector according to a preferred embodiment of the invention.

With reference to FIG. 2 in combination with FIG. 1, according to the present invention, a switch 15 is connected across the terminals of microphone 13 such that momentary closure of the switch 15 causes a short circuit across the microphone terminals. Such a feature is known in the art for implementing a microphone mute function.

Headset microphone bias circuit 17 and handset microphone bias circuit 18 provide bias current for the microphone of handset 3 and for microphone 13, respectively. A microphone amplifier 19 is connected differentially to each of the bias circuits 17 and 18 for amplifying the low voltage output signals therefrom. An output of microphone amplifier 19 is connected to a handset microphone input of a phone chip 20 within the telephone set 1. The earpieces 11 of the headset 7 and the earpiece of the handset 3 are connected together and to an output of phone chip 20.

According to the present invention a headset hookswitch detector 21 is connected to the output of headset microphone bias circuit 17. Detector 21 preferably comprises a comparator having inputs connected to a voltage divider in the form of a plurality of series connected resistors between a source of predetermined voltage and ground. In response to a momentary closure of switch 15, a DC voltage level at the input of the comparator will shift. By properly biasing the comparator using well known principles, the comparator detects the DC voltage shift and in response generates a signal (Swk) which is detected by microcontroller 23, as discussed in greater detail below.

A headset present detector 25 is also connected to the output of microphone bias circuit 17 for providing a signal to microcontroller 23 for indicating that headset 7 is connected to the set 1. Since many headsets are connected to telephones via a "quick-disconnect" plug, when the handset 3 is left in its cradle and the headset 7 is disconnected, it is still possible to use the telephone via the handset operation.

According to an aspect of the present invention, the signal output from detector 25 is also applied to a control input of handset microphone bias circuit 18 via a conversion circuit 27 which translates logic level signals from the detector 25 to levels suitable to disable the microphone bias circuit (e.g. circuit 27 can be a transistor switch, relay contact or other well known disabling circuit).

The telephone hookswitch 29 located in the handset cradle of telephone set 1 is connected to microcontroller 23 for causing generation of an enable handset signal in response to lifting the handset 3 from the cradle for normal operation, without a headset.

For headsets without a mute button, when in the headset mode of operation, a feature key (not shown) of the telephone set 1 may be assigned to function as an off hook indicator such that in response to activating the special feature key (instead of lifting handset 3 from its cradle), audio is sent to both the handset 3 and headset 7. However, the signal output from headset present detector 25 disables the microphone of handset 3 to prevent background noise pickup.

Figure 3A:
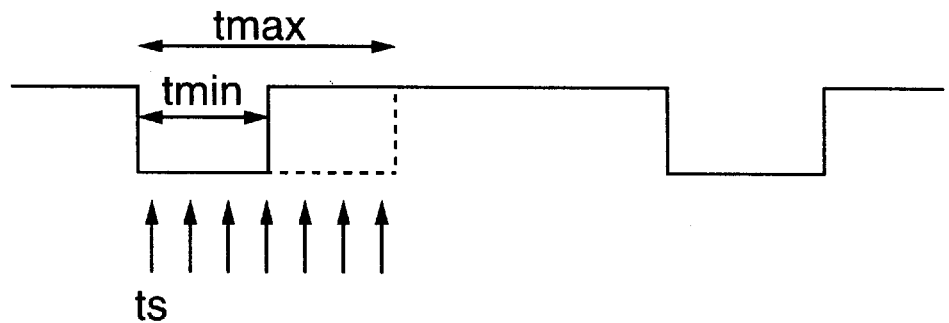
FIG. 3 comprises FIGS. 3a, 3b and 3c, and comprises a timing diagram showing timing criteria for detecting a hookswitch flash signal according to the preferred embodiment.
Figure 3B:
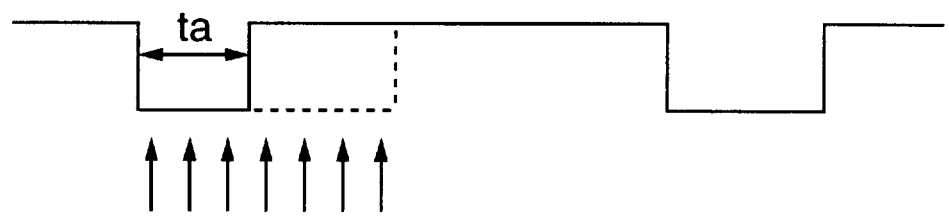
Figure 3C:
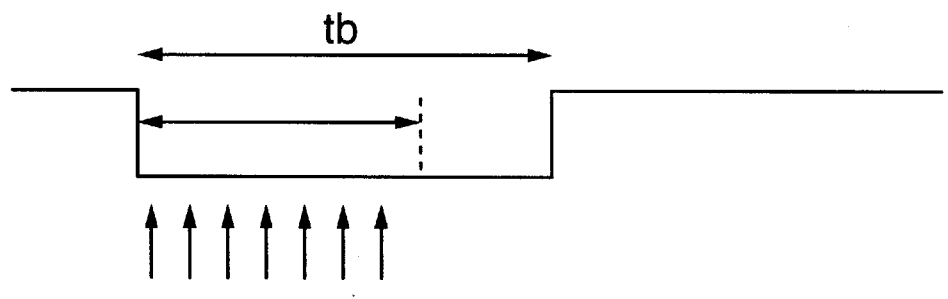

In response to momentarily closing switch 15, the microphone 13 is muted and the headset hookswitch signal Swk goes active. With reference to FIG. 3, a method is shown by which the microcontroller 23 distinguishes between a hookswitch event caused by activating Swk and a microphone mute. Specifically, microcontroller 23 samples the headset hookswitch input at a sampling rate "ts" (e.g. 100 ms). If the momentary closure of switch 15 is shorter than a predetermined minimum (i.e. ta<tmin (e.g. 400 ms in FIG. 3b), the closure is determined to be accidental and is therefore ignored. In this manner, the microcontroller 23 performs a switch debouncing function. If the switch closure is sustained for longer than a predetermined maximum duration (i.e. tb>tmax (e.g. 800 ms) in FIG. 3c), the closure is interpreted as a microphone mute. If the switch 15 is closed for an interval between tmin and tmax, the microcontroller 23 interprets the closure as a valid hookswitch flash and in response implements a predetermined special feature.

It is contemplated that the firmware of microcontroller 23 could be programmed to initiate different features depending on duration of closure or duty cycle of closing of the switch 15. For example, one momentary closure could be used to toggle between parked calls, two closures in rapid succession could be used to initiate music on hold, while a long closure could be used to end a call in progress.

Although the switch 15 is shown located at the headset 7, it is also contemplated that the switch could be located at a headset interface box (not shown) between the headset 7 and telephone set 1. In either case, provision of the local switch 15 relieves the user from having to reach over to the set in order to force an off-hook condition. It is also contemplated that the switch 15 can be installed as a retrofit to existing headsets in the form of a series device which can dangle from the cable connecting the headset 7 to the telephone set 1 or interface box.

Other embodiments and variations are possible without departing from the sphere and scope of the invention as defined by the claims appended hereto.

I claim:

1. A hookswitch flash detector for a headset connected to a telephone, comprising:

a switch for short circuiting a microphone of said headset, resulting in muting of said microphone;

a circuit for detecting said short circuiting of said microphone and in response generating a hookswitch signal; and a microcontroller for measuring duration of said hookswitch signal and in the event the duration of said hookswitch signal is less than a predetermined minimum duration or longer than a predetermined maximum duration then ignoring said hookswitch signal, and in the event the duration of said hookswitch signal is intermediate said predetermined minimum duration and said maximum duration then interpreting said hookswitch signal as a hookswitch flash for implementing a telephone special feature.

2. The hookswitch flash detector of claim 1, further comprising a headset presence detector for detecting connection of said headset to said telephone and in response disabling a handset microphone of said telephone for eliminating background noise pickup.

3. The hookswitch flash detector of claim 1, wherein said switch is integrated into said headset.

4. The hookswitch flash detector of claim 1 wherein said circuit is integrated into said telephone.

* * * * *